Dec. 26, 1933.  G. J. SHELLEY  1,941,022
METHOD OF ASSEMBLING CLUTCH PARTS
Filed Aug. 19, 1930

Inventor
G. J. Shelley
By Clarence A. O'Brien
Attorney

Patented Dec. 26, 1933

1,941,022

UNITED STATES PATENT OFFICE

1,941,022

METHOD OF ASSEMBLING CLUTCH PARTS

Guy J. Shelley, Mesa, Ariz.

Application August 19, 1930. Serial No. 476,331

1 Claim. (Cl. 33—181)

This invention relates to the art of assembling clutch parts, and has as its prime object the provision of a new method of assembling clutches from clutch parts that include a flywheel provided with a centrally arranged pilot bearing together with a driven plate provided with a hub for alinement with the pilot bearing for accommodating the clutch driven shaft which is passed through the hub of the driven plate and into the pilot bearing of the fly wheel.

More specifically stated, the invention has reference to a method of assembling disk or plate clutches, and the method embodying the invention is characterized by the rapidity and accuracy with which the parts may be assembled.

The above and numerous other objects of the invention will became more apparent during a study of the following description, taken in connection with the accompanying drawing, wherein.

Figure 1:
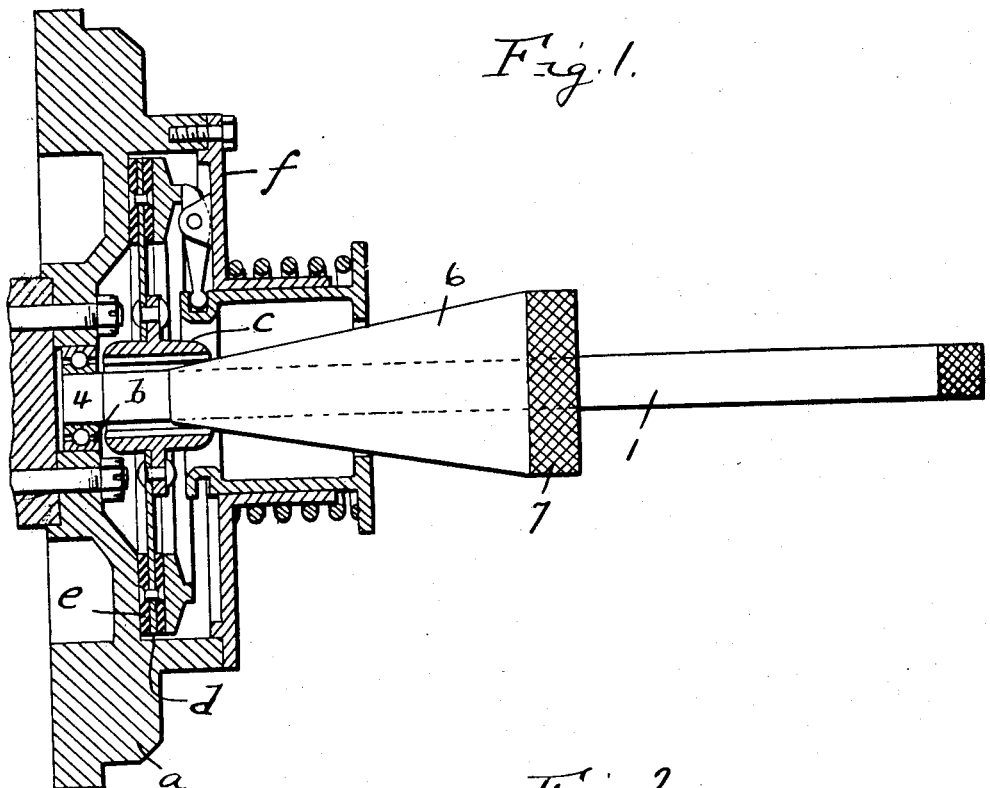
Figure 1 is a vertical sectional view taken through a clutch assembly, showing the application of the aligning tool used in carrying out the method.
Figure 2:
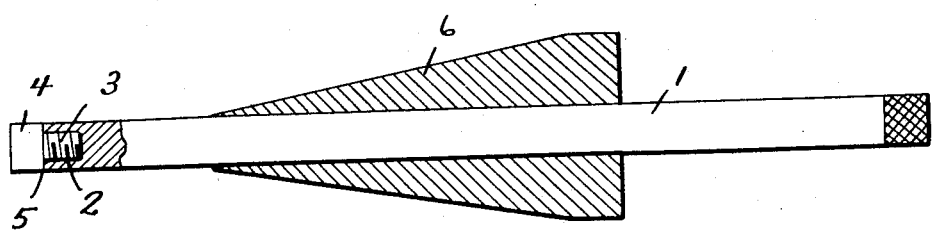
Figure 2 is a detail view, partly in section and partly in elevation, of the aligning tool, certain parts of the shaft being broken away.

Referring now in detail to the drawing, it will be seen that I have shown a clutch assembly which includes in the present instance, among other parts, the usual flywheel $a$ provided with the usual pilot bearing $b$; a driven plate $d$ provided with the usual hub $c$ that is adapted to aline with the bearing $b$, whereby to permit the driven shaft of the clutch to pass through the hub $c$ into the bore of the bearing $b$.

The present invention resides particularly in the method of assembling the parts of the clutch so as to leave the clutch parts in readiness to receive the driven shaft. Thus, in accordance with the present invention, the parts of the clutch are first assembled loosely in position, after which an alining tool hereinafter more specifically referred to is inserted through the hub $c$ of the driven plate $d$—and into the pilot bearing $b$. With the alining tool held in substantial alinement with the pilot bearing so as to aline the driven plate with the pilot bearing, the clutch parts are finally locked in position permitting the alining tool to be withdrawn keeping the clutch parts in readiness to receive the driven shaft.

The alining tool in the present instance comprises a shank or rod 1 which at one end is provded with an internally threaded axial socket 2 for threadedly receiving the threaded shank 3 of a head or "pilot" 4. When the shank 3 is threaded into the socket 2 the head 4 is forced into abutting engagement with the adjacent end of the rod 1 as at 5. An elongated substantially conical member 6 has an axial opening therethrough for receiving the shank 1, and at the largest end thereof the member 6 is provided with a knurled surface 7 to provide a gripping surface for the hand or a suitable tool for moving the member 6 into engagement with the hub $c$ of the driven clutch plate $d$.

The use of the tool will be apparent from the following:

As aforementioned, the clutch parts are first assembled loosely in position after which the pilot-equipped end of the shank 1 is inserted through the hub $c$ and into the pilot bearing $b$, the head 4 fitting snugly within the bearing as shown in Figure 1. With the shank 1 in substantial alinement with the center of the pilot bearing, the member 6 is moved lengthwise of the shank in the direction of the bearing $b$ for engaging the hub $c$ of the driven plate so as to aline said hub with the pilot bearing. This operation completed, the parts are then locked in position after which the tool is withdrawn leaving the clutch parts in readiness to receive the driven shaft.

Having thus described my invention, what is claimed is:

The method of assembling disk or plate clutches, which consists in assembling the parts loosely in position, inserting an aligning tool through the driven plate of the clutch and into the pilot bearing for the driven shaft, holding said aligning tool in substantial alignment with the center of said pilot bearing so as to align the driven plate of said clutch with said bearing, then finally locking said clutch parts in position, and then withdrawing said tool leaving the clutch parts in readiness to receive the driven shaft.

GUY J. SHELLEY.